United States Patent
Auquier

(12) 
(10) Patent No.: US 6,431,976 B1
(45) Date of Patent: Aug. 13, 2002

(54) ROTARY DISTRIBUTION CHAMBER FOR SELECTIVE DISTRIBUTION OF A FLUID

(75) Inventor: Michael George Auquier, Chelsea, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/771,245

(22) Filed: Jan. 26, 2001

(51) Int. Cl.[7] .................................................. B60S 1/54
(52) U.S. Cl. ................. 454/121; 137/625.22; 137/625.4
(58) Field of Search .................................. 454/121, 156, 454/159, 160, 161; 137/625.46, 625.47, 875, 625.21, 625.22, 625.24

(56) References Cited

U.S. PATENT DOCUMENTS

| | | | |
|---|---|---|---|
| 3,190,584 A | * | 6/1965 | Gire et al. |
| 3,659,515 A | * | 5/1972 | Galaniuk |
| 3,851,797 A | * | 12/1974 | Jacobs |
| 4,476,773 A | * | 10/1984 | Fehr |
| 5,062,352 A | * | 11/1991 | Ostrand |
| 5,399,120 A | * | 3/1995 | Burns et al. ............. 454/121 X |
| 5,771,928 A | | 6/1998 | Zepic et al. ........... 137/625.22 |
| 5,979,492 A | * | 11/1999 | Miller ................ 137/625.47 X |
| 5,983,940 A | | 11/1999 | Smith .................... 137/625.22 |
| 6,113,483 A | | 9/2000 | Schambre et al. .......... 454/121 |

FOREIGN PATENT DOCUMENTS

| | | | |
|---|---|---|---|
| DE | 34 21 323 | * 12/1985 | .................. 454/121 |
| FR | 1.359.909 | * 3/1964 | .................. 454/121 |

* cited by examiner

*Primary Examiner*—Harold Joyce
(74) *Attorney, Agent, or Firm*—Brinks Hofer Gilson & Lione

(57) ABSTRACT

An air distribution chamber that allows selective distribution of air to a variety of vents or combinations thereof is provided. The distribution chamber comprises a nested pair of chambers that define a central cavity having an open and closed end, a shaft that allows axial and rotational movement of the inner chamber within the outer chamber, an actuator that controls such movement, a stabilizer for maintaining the open end and receiving the shaft, and a seal between the inner and outer chambers. The outer chamber defines a series of flanged openings, and the inner chamber defines a series of apertures. The flanged openings are of a form that allows connection of the distribution chamber to ducts. When the inner and outer chambers are aligned such that the openings and apertures overlap, defining one or more communicative passageways, air is able to escape from the cavity, through the aperture and opening, and into the duct. By responding to mode selection by a user, the actuator moves the inner chamber such that appropriate alignments are made, and the selected mode of air distribution is achieved.

22 Claims, 9 Drawing Sheets

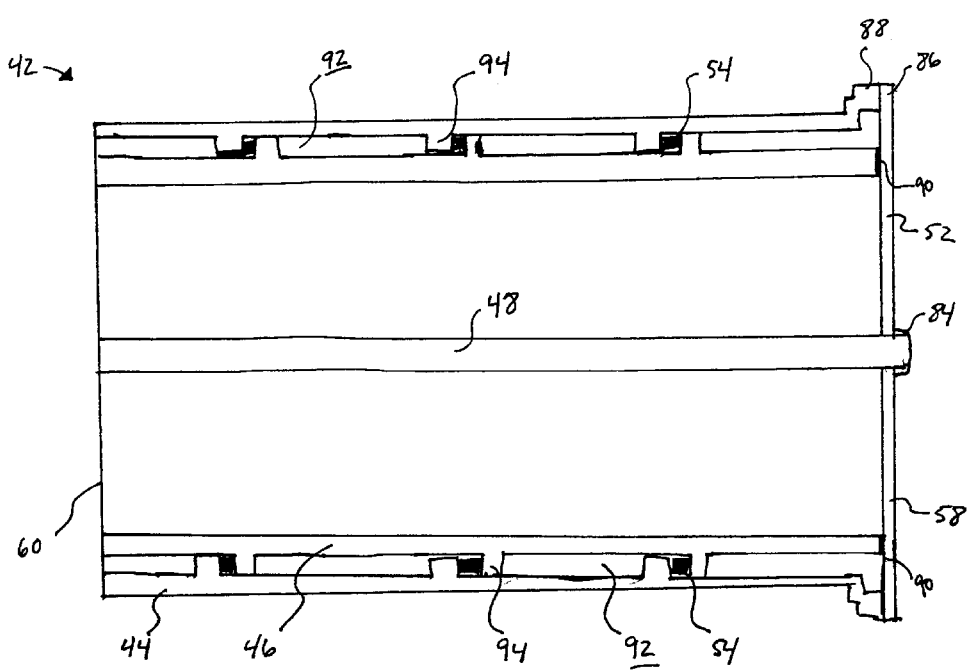

ROTARY DISTRIBUTION CHAMBER FOR SELECTIVE DISTRIBUTION OF A FLUID

FIELD OF THE INVENTION

The present invention relates generally to systems for the selective distribution of fluid. More specifically, the present invention relates to air distribution systems for motor vehicles and a rotary air distribution chamber that achieves the selective distribution of air in such a system.

BACKGROUND OF THE INVENTION

There are numerous applications in which it is desirable to distribute a fluid in a selective manner, i.e., distribute the fluid or portions of the fluid to various distinct locations. For example, motor vehicles, such as automobiles, planes, and other transportation and utility vehicles, normally include a ventilation system for distributing air to the passenger compartment. These systems frequently include a variety of vent locations, such a floor vents, instrument panel vents, defrost vents, rear passenger vents and others. Furthermore, most systems allow the user to select an operating mode that distributes air to a single desired vent or a combination of several vents.

To accomplish this selective distribution of air, the system must include a distribution chamber that is capable of directing air flow to the appropriate vent or vents, as selected by the user. Some distribution chambers take the form of a box having a plurality of doors, with each door serving as an opening to a particular pathway that ultimately terminates in a vent. These box like structures are frequently bulky and, due to the use of doors, difficult to manufacture and repair. Another design for these distribution chambers includes a cylindrical housing having multiple inner barrels, such as that disclosed in U.S. Pat. No. 6,113,483 to Schambre et al for a VARIABLE MODE AIR DISTRIBUTION SYSTEM. This design is still relatively complex in that it requires multiple interior barrels and involute surfaces attached or integrally formed on the barrels. Furthermore, the presence of involute surfaces results in areas within the distribution chamber that may collect dead air when the barrels are not aligned in a manner that creates an opening. This may decrease the efficiency of the distribution chamber. Also, this design does not include any restriction on the rotation of the barrels other than the actuator or controller. This may result in inadvertent movement of the barrels, which may alter the flow of air through the chamber.

SUMMARY OF THE INVENTION

The present invention provides a rotary distribution chamber for a fluid distribution system that comprises a nested pair of chambers. At least one surface of each chamber defines multiple sections with stepped diameters, and each section has at least one opening. When the opening of a section on one chamber is aligned with the opening of the adjacent section on the other chamber, fluid from within the rotary distribution chamber is able to escape through the aligned openings for travel down connected pathways. The rotary distribution chamber further includes a shaft that allows axial and rotational movement of the inner chamber, an actuator that controls such movement, and a series of seals between the two chambers at the spaces between the stepped diameters. The structure of the rotary distribution chamber and its operational features provide an uninterrupted chamber with direct access to the openings corresponding to selected vents in a vehicle air distribution system. Thus, there is no dead space within the rotary distribution chamber, which allows for unimpeded flow of air through the distribution chamber into the selected vents. Furthermore, the seal, in addition to the ability of the inner chamber to move along its axis, restricts the rotation of the inner barrel, thereby preventing inadvertent changes in air flow.

BRIEF DESCRIPTION OF THE DRAWINGS

FIG. 7 presents a series of examples of rotary distribution chambers in accordance with a first embodiment of the present invention. The individual chambers are configured for particular air distribution modes.

FIG. 8 is a cross-sectional view of a rotary distribution chamber in accordance with a second embodiment of the present invention.

DETAILED DESCRIPTION OF THE INVENTION

The following description of two embodiments of the invention is not intended to limit the scope of the invention in any manner. The embodiments are exemplary in nature, and are intended to enable a person of ordinary skill in the art of fluid distribution systems to make and use the invention.

Figure 1:
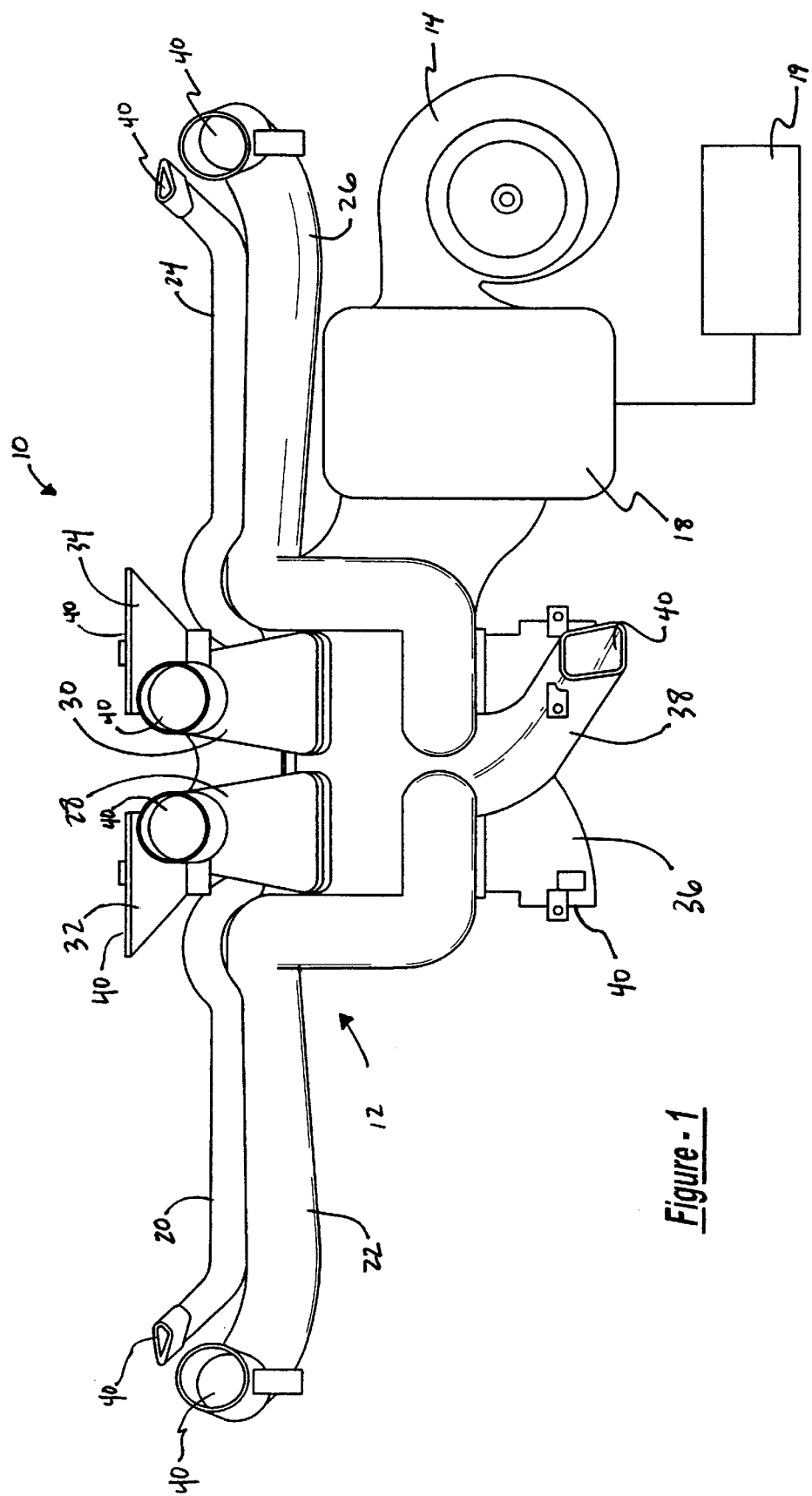
FIG. 1 is a block diagram of an air distribution system for a motor vehicle.

FIG. 1 illustrates an air distribution system, generally indicated at reference 10, for incorporation into a motor vehicle. Air distribution system 10 comprises a plurality of passageways or ducts 12, a blower 14, a conditioning system 16, a central housing 18, and a control center 19 having various buttons and/or levers, etc. (not illustrated). The plurality of ducts 12 can include any number of passageways, so long as the blower 14 is capable of supporting airflow through the passageways. The plurality of ducts 12 in a typical air distribution system 10 includes at least the following: a left demist duct 20, a left panel duct 22, a right demist duct 24, a right panel duct 26, a left central panel duct 28, a right central panel duct 30, a left defrost duct 32, a right defrost duct 34, a left floor duct 36, and a right floor duct 38. Each of the ducts terminates in an opening 40 that is typically connected to a vent in the interior passenger compartment of the vehicle.

The central housing 18 serves as a central connecting point for the plurality of ducts 12 and encases the componentry responsible for distributing air or portions thereof to the ducts 12. Thus the central housing 18 encases the rotary distribution chamber of the present invention. FIGS. 2–7 illustrate one embodiment of the rotary distribution chamber 42 exclusive of the remainder of the air distribution system 10. The rotary distribution chamber 42 is preferably comprised of an outer chamber 44, an inner chamber 46, a shaft 48, an actuator 50, and a stabilizer 52. A series of seals 54 are preferably situated between the outer 44 and inner 46 chambers. The inner chamber 46 defines an interior cavity 56. As a unit, the rotary distribution chamber 42 has one open end 58 and one closed end 60. In operation, air from the blower 14 enters the rotary distribution chamber 42 by traveling past the stabilizer 52, through the open end 58, and into the interior cavity 56. The air is allowed to escape the interior cavity 56 to one or more of the ducts 12 only when the outer 44 and inner 46 chambers are aligned in any of several modes, as will be developed more fully below. In this way, the configuration of the rotary distribution chamber 42 selectively controls the distribution of air in the air distribution system 10.

The rotary distribution chamber 42 can be utilized to selectively distribute any fluid capable of flowing through the chamber 42, as described below, among a series of connected passageways. The rotary distribution chamber 42 is particularly well suited for incorporation into an air distribution system 10 of a motor vehicle.

The outer 44 and inner 46 chambers interact with each other in a manner that allows a seal to be made between the two chambers 44, 46. In a first embodiment, this relationship is accomplished by way of a stair-step relationship between the two chambers 44, 46. That is, the inner chamber 46 is nestably fitted within the outer chamber 44. Preferably, when nested together, a space exists between the chambers 44,46. This nesting is accomplished by the interaction between a first series of stepped diameters 62 located on the outer chamber 44 and a second series of stepped diameters 64 located on the inner chamber 46. Preferably, the first and second series of stepped diameters 62, 64 are located on and defined by the outer surfaces of the respective chambers 44, 46 and grow larger as the chambers 44, 46 proceed from a closed end 60 to the open end 58 of the rotary distribution chamber 42. Alternatively, any arrangement of a first series 62 and second series 64 of stepped diameters on the outer 44 and inner 46 chambers that allows a nested interaction between the chambers 44, 46 is acceptable. For example, the outer chamber 44 may define a continuous outer surface, i.e. no stepped diameters on the outer surface, while defining the first series of stepped diameters 62 on the interior of the outer chamber 44. In this embodiment, the inner chamber 46 is nestably fitted within the outer chamber 44 by the interaction of the second series of stepped diameters 64 on the exterior of the inner chamber 46 and the first series of stepped diameter 62 located on the interior of the outer chamber 44. This embodiment allows the nested fitting of the present invention while still providing a continuous surface on the exterior of the rotary distribution chamber 42.

Each of the individual sections in both the first series 62 and second series 64 of stepped diameters corresponds to a particular zone of vents in the vehicle. Thus, in one example, a first section 66 on both the outer and inner chambers 44, 46 corresponds to the floor zone of the vehicle, a second section 68 corresponds to a panel zone, a third section 70 corresponds to a defrost zone, and a fourth section 72 corresponds to a side demist zone. Each of the sections in the first series of stepped diameter 62 defines an opening 74 surrounded by a flange 76. The flange 76 facilitates a connection between the diameter and the appropriate duct of the air distribution system 10. For example, the opening 74 on the diameter 66 for the floor zone is ultimately connected to the duct for the floor vents when the rotary distribution chamber 42 is positioned within the air distribution system 10. The flange 76 provides a surface on which connectors, such a screws, bolts, or rivets, can secure this connection between the section 66 and the duct.

Figure 2:
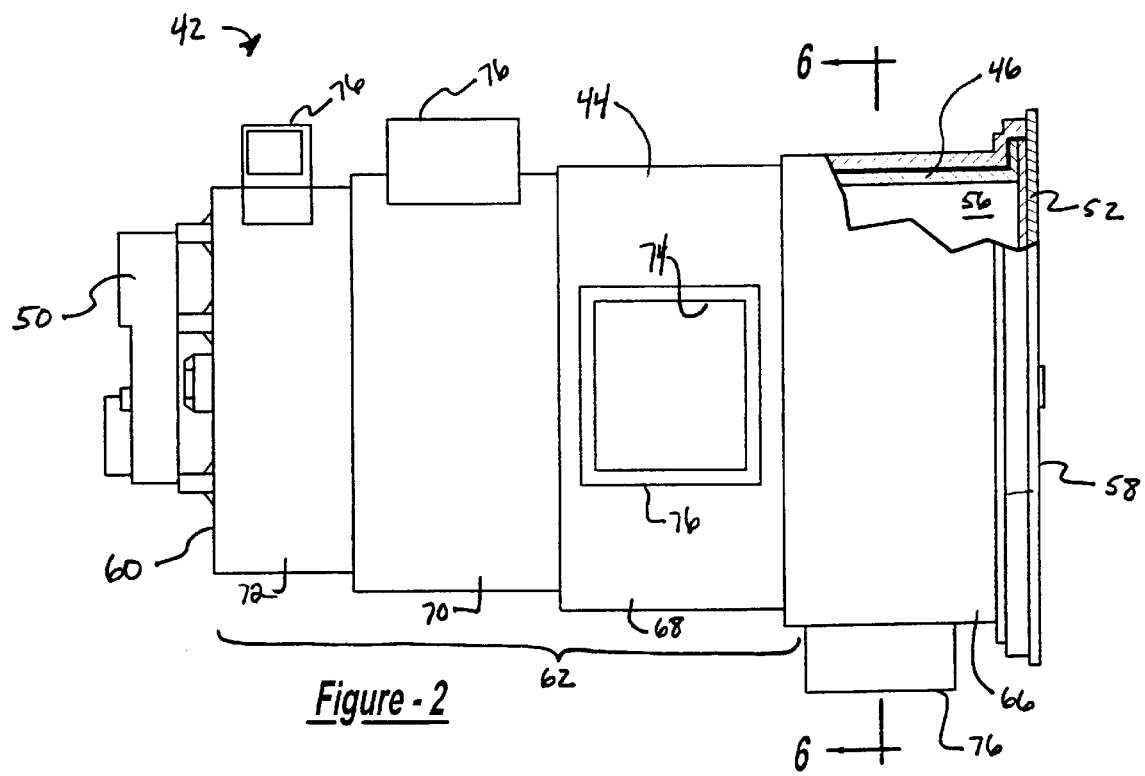
FIG. 2 is a perspective view of a rotary distribution chamber, partially broken away to show interior components, in accordance with a first embodiment of the present invention.

As best illustrated in FIG. 2, the openings 74 of the outer chamber 44 are preferably staggered in position relative to each other. As a result of this arrangement, the flanges 76 of the openings 74 are likewise staggered relative to each other, which facilitates connection of the rotary distribution chamber 42 to the plurality of ducts 12. To further facilitate the connection, the openings 74 are positioned on the outer chamber 44 in a manner that makes them accessible to the appropriate ducts 12. Thus, as illustrated in FIG. 2, the opening 74 and corresponding flange 76 for the first section 66, which corresponds to the floor zone, is generally positioned downward.

As indicated above, the second series of stepped diameters 64 is preferably located on the exterior surface of the inner chamber 46. The structure of the second series of stepped diameters 64 is such that the inner chamber 46 can be nested within the outer chamber 44. Each of the diameters in the second series of stepped diameters 62 defines at least a single aperture 78. Unlike the flanged openings 74, the apertures 78 preferably do not contain a flange 76. Rather, the apertures 78 are preferably simple cut-outs on the surface of the inner chamber 46. The aperture 78 is preferably similar in size to the opening 74 in the corresponding section of the first series of stepped diameters 62. Also preferably, each of the sections in the second series of stepped diameters 64 define multiple apertures 78. As will be developed more fully below, this arrangement of multiple apertures 78 on each section of the second series of stepped diameters 64 increases the ease of operation and possible mode configurations of the rotary distribution chamber 42.

Both the outer 44 and inner 46 chambers are preferably composed of a plastic material. Both parts can be readily manufactured by techniques known in the art, such as injection and/or blow molding. The use of these molding techniques allows easy formation of the various structural features of the chambers 42, 44, such as the stepped diameters 62, 64, openings 74, flanges 76, and apertures 78.

Figure 5:
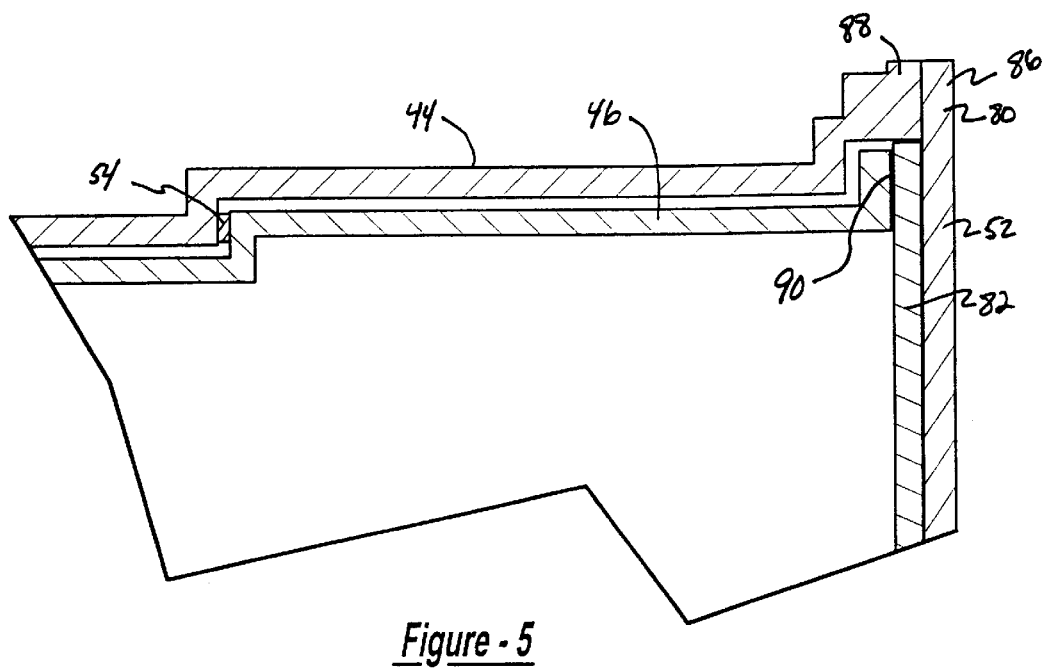
FIG. 5 is a magnified view of the circled area identified as 5 in FIG. 4 and shows a seal between the inner and outer chambers and the interaction between the stabilizer and the chambers.
Figure 3:
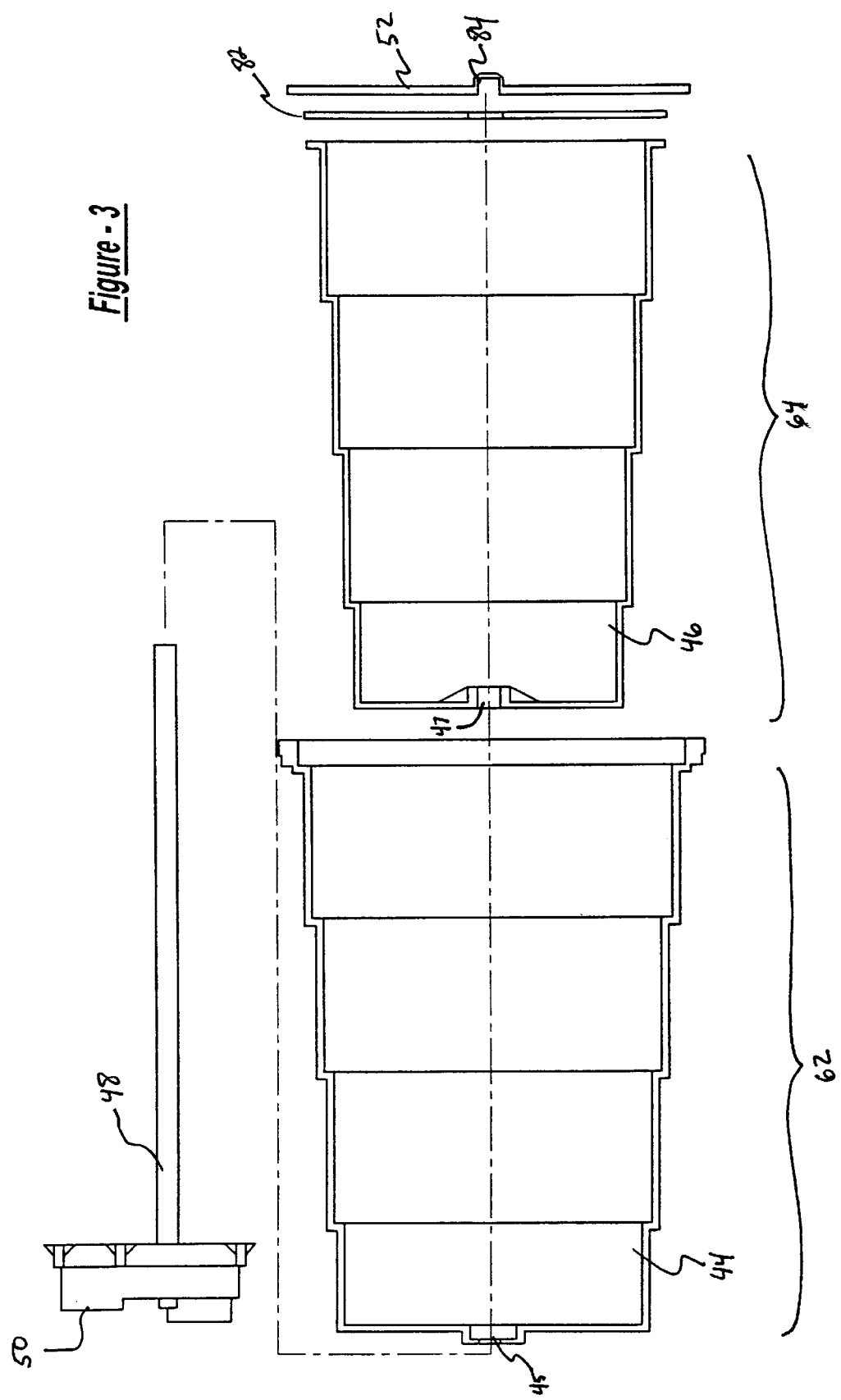
FIG. 3 is an exploded view of a rotary distribution chamber in accordance with a first embodiment of the present invention.
Figure 4:
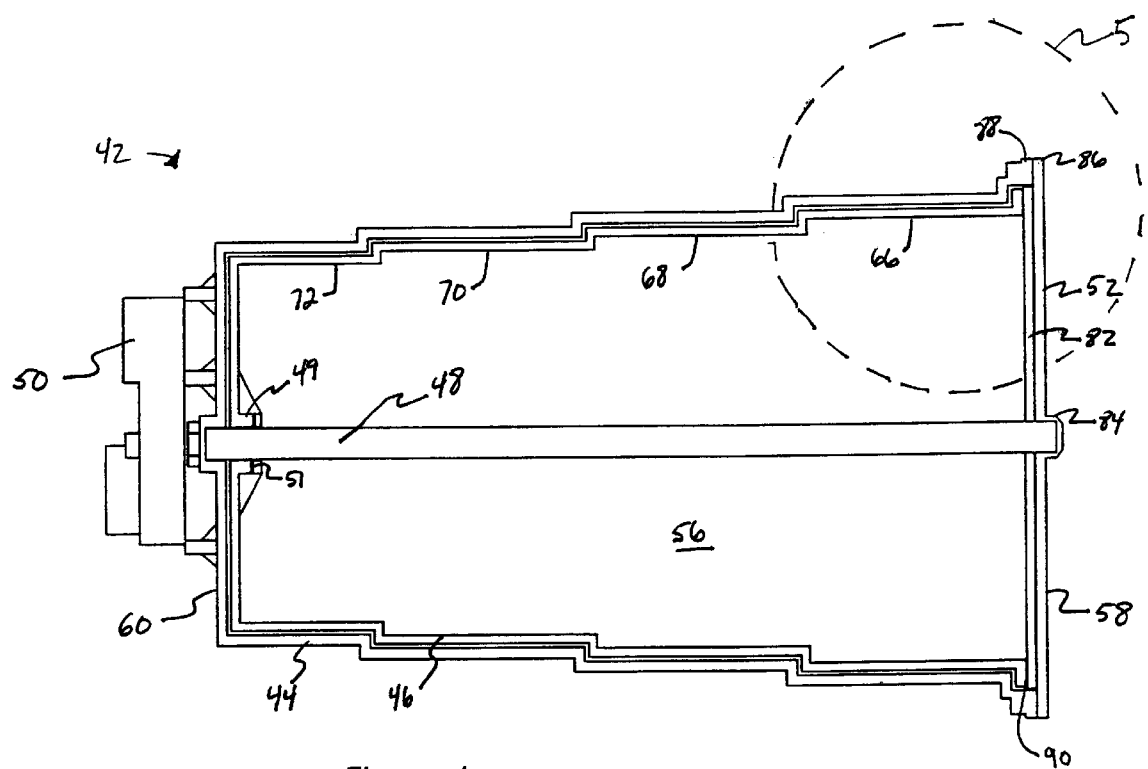
FIG. 4 is a cross-sectional view of a rotary distribution chamber in accordance with a first embodiment of the present invention.
Figure 6:
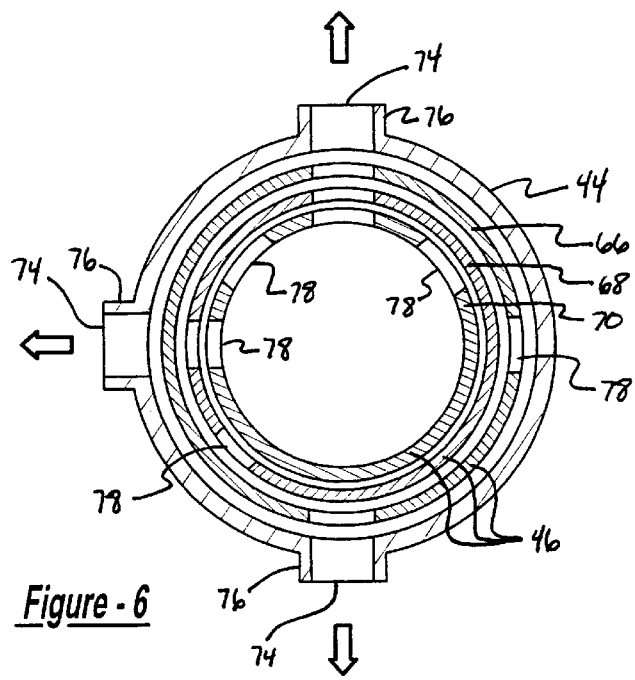
FIG. 6 is a cross-sectional view of a rotary distribution chamber taken along line 6—6 in FIG. 2.

As best illustrated in FIG. 5, a seal 54 may be situated in the space between the outer 44 and inner 46 chambers at each of the points at which the first series of stepped diameters 62 interacts with the second series of stepped diameters 64. That is, the seal 54 is located between the outer 44 and inner 46 chambers at the stagger portions of the step formed by the stepped diameters 62, 64. The inclusion of a seal 54 in the rotary distribution chamber 42 is desirable when the fluid distributed by the chamber 42 is able to pass between the outer 44 and inner 46 chambers when the first 62 and second 64 series of stepped diameters are nested against each other. For example, the preferred embodiment is directed at an air distribution system 10. Because air is able to escape through very small openings, the use of a seal 54 is desirable in this embodiment. In other embodiments, the need for a seal 54 will depend on the ability of the fluid to move between the outer 44 and inner 46 chambers. When present, the seal 54 is preferably circumferential in nature, i.e., seal 54 extends around the entire perimeter of the diameter. Also, when multiple seals 54 are present, i.e., a seal 54 is present between the multiple sections, it is preferable that the seals 54 have identical compositions and physical characteristics, such as width.

The seal is composed of material capable of serving as a barrier to the fluid being directed by the distribution chamber. In the preferred embodiment, the seal 54 comprises a foam member. The use of such a barrier prevents air from escaping into any space between the outer 44 and inner 46 chambers beyond the zone selected, thereby assuring that air does not inadvertently travel to openings 74 corresponding to unselected zones. Any type of foam suitable for serving as a barrier to the fluid being distributed by the rotary distribution chamber 42 may be used in the seal 54. For the application of a vehicle air distribution system 10, a closed cell foam has been found to be acceptable. Alternatively, a rubber o-ring can be utilized. Furthermore, the seal 54 may be composed of any other material, such as plastic or silicone, that serves as a suitable barrier to the particular fluid being distributed by the rotary distribution chamber 42.

To allow the inner chamber 46 to move within the outer chamber 44, the seal 54 is secured to only one of the chambers 44,46. Preferably, the seal 54 is secured to the outer chamber 44. The seal 54 can be secured by any suitable means of attachment. Due to the ease of application, it is preferable that the seal 54 is secured by use of an adhesive, either applied directly to the seal 54 or chambers 44, 46 or as a backing layer on the seal 54.

The shaft 48 is preferably an elongate tubular member centrally disposed in the rotary distribution chamber 42, extending from the open end 58 to the closed end 60. As will be more fully developed below, one end of the shaft 48 is connected to the actuator 50, and the other end may be connected to or received by the stabilizer 52. The shaft extends through the first 45 and second 47 main openings, defined by the outer 44 and inner 46 chambers, respectively. A bushing 49 preferably sits on one end of the shaft 48 and serves to transfer movement of the shaft onto the inner chamber 46. The shaft 48 can take on any cross-sections shape, and the bushing 49 and first 45 and second 47 main openings have a shape preferably complimentary to the cross-sectional shape of the shaft 48. Also preferable, the shaft 48 is a hollow metal member, but there is no need that the shaft be either hollow or metal. The shaft 48 allows the inner chamber 46 to move along its longitudinal axis, and also to rotate about its axis.

The stabilizer 52 serves as a structural reinforcement by fitting into the open end 58 of the rotary distribution chamber 42. The stabilizer comprises a perimeter 80, a plurality of spokes 82, and a recess 84. As best illustrated in the magnified view shown in FIG. 5, the perimeter 80 defines a lip 86 that structurally cooperates with a flanged mouth 88 defined by the outer chamber 44 such that the stabilizer 52 is held in position and a gap 90 is formed between the perimeter 80 of the stabilizer 52 and the end of the inner barrel 46. This gap 90 allows the inner barrel 46 to move axially within the outer barrel 44. The gap 90 need be only large enough to allow decompression and recompression of the seal 56 upon axial movement of the inner barrel 46. In the preferred embodiment, the gap 90 is between approximately ¼" and 3/16". Alternatively, the stabilizer 52 can be secured to the outer chamber 44 with fasteners, such as screws, rivets, or any other type of fastener.

The spokes 82 are positioned within the stabilizer 52 such that the stabilizer 52 assures that the open end 58 remains open while minimizing disturbance of airflow coming into the open end 58. The number and size of the spokes 82 are such that the stabilizer 52 has only minimal effect on the flow of air through the open end 58 and into the interior cavity 56. For the embodiment directed at an air distribution system 10 in a motor vehicle, three narrow spokes 82 spaced equidistant from each other within the stabilizer 52 has been found to be suitable. The recess 84 is preferably a centrally located, cup-shaped element capable of receiving the end of the shaft 48 opposite the actuator 50. The recess 84 allows the shaft 48 to rotate within its body. Similar to the outer 44 and inner 46 chambers, the stabilizer is preferably composed of plastic and can be fabricated by methods known in the art, such as injection molding.

The actuator 50 is preferably disposed at the closed end 60 of the rotary distribution chamber 42. The actuator 50 is connected to one end of the shaft 48. Preferably, the actuator 50 is capable of initiating dual motion of the shaft 48. That is, it is preferable that the actuator 50 be capable of moving the shaft 48 along its lengthwise axis, as well as rotating the shaft 48 about the same axis, i.e., axial and radial movement. Alternatively, the actuator 50 can be capable of radial movement only, and a spring bias mechanism can be employed to control the compression and decompression of the seal 54. The actuator 50 can accomplish the movement of the shaft 48 by either electrical or mechanical means or a combination of both. Also, it is preferable that the actuator can accomplish both clockwise and counter-clockwise radial movement.

As indicated above, a bushing 49 is preferably disposed about the end of the shaft connected to the actuator 50. The bushing 49 is positioned on the shaft 48 at a point where the shaft 48 enters the outer 44 and inner 46 chambers. A locking or fastening device 51 holds the inner chamber on the bushing such that the inner chamber 46 moves as the shaft 48 moves. Preferably, the locking or fastening device 51 comprises a pin, such as a cotter pin. Alternatively, the device 51 can comprise a rivet, a threaded fastener, or any other suitable fastener.

The operation of the rotary distribution chamber 42 will now be described. In this example, the rotary distribution chamber 42 is situated in the central housing 18 of the air distribution system 10. Not illustrated in the figures, the air distribution system 10 includes one or more conventional mechanisms by which a user can select a desired mode of operation, such as levers or buttons. Once a user makes a choice regarding a desired mode of operation, such as by moving a lever or pushing a button, the actuator 50 is energized or otherwise prepared to initiate movement and moves the shaft 48 in an axial direction away from the closed end 60 of the rotary distribution chamber 42. This movement results in a separation of the adjacency of the outer chamber 44, inner chamber 46, and seal 54. Once the seal 54 is decompressed in this manner, the inner chamber 46 is able to rotate about its lengthwise axis in an unrestricted manner. Next, the actuator 50 initiates rotational movement of the shaft 48 appropriate in degree and direction to rotate the inner chamber 46 to the selected operating mode. This rotation stops when the appropriate apertures 78 of the inner chamber 46 is aligned with the appropriate openings 74 in the outer chamber 44 for the operating mode selected and to the preferred extent. The opening 74 and aperture 78 can be completely aligned, allowing maximum flow through the communicative passageway defined by the alignment, or the flow can be metered by varying degrees of alignment between the opening 74 and aperture 78. Depending on the mode selected, this may require the alignment of a single aperture 78 and a single opening 74 or several apertures 78 with several openings 74. Once proper alignment is achieved, the actuator 50 moves the shaft 48 along its lengthwise axis back to the initial position, thereby returning the inner chamber 46 to its original position. That is, the actuator 50 establishes the adjacency of the inner chamber 46, outer chamber 44, and the seal 54. This movement results in sufficient recompression of the seal 56, and reestablishes the limitation on the ability of the inner chamber 46 to rotate about its lengthwise axis, thereby ensuring proper distribution of air flow.

Now, by way of example, the various modes of the rotary distribution chamber 42 will be described. FIGS. 7A through 7H illustrate several possible modes of the rotary distribution chamber 42. It should be noted, however, that the modes depicted in the figures are illustrative in nature only, and are not intended in any way to limit the scope of the present invention. In each of the figures, a cross-section of the rotary distribution chamber 42 is shown. The second series of step diameter 62, a series located on the inner chamber 46, is shown as a series of concentric circles, with the floor, panel, and defrost zone diameters shown. For purposes of simplicity, the first series of stepped diameters 62, located on a surface of the outer chamber 44, are not illustrated. Rather, the outer chamber 44 is depicted as a single circle. Also in each of the figures, the openings 74 of the outer chamber 44 are as follows: the opening corresponding to the floor zone is pointed downward, the opening corresponding to the panel zone is pointed towards the left, and the opening corresponding to the defrost zone is pointing upward.

Figure 7A:
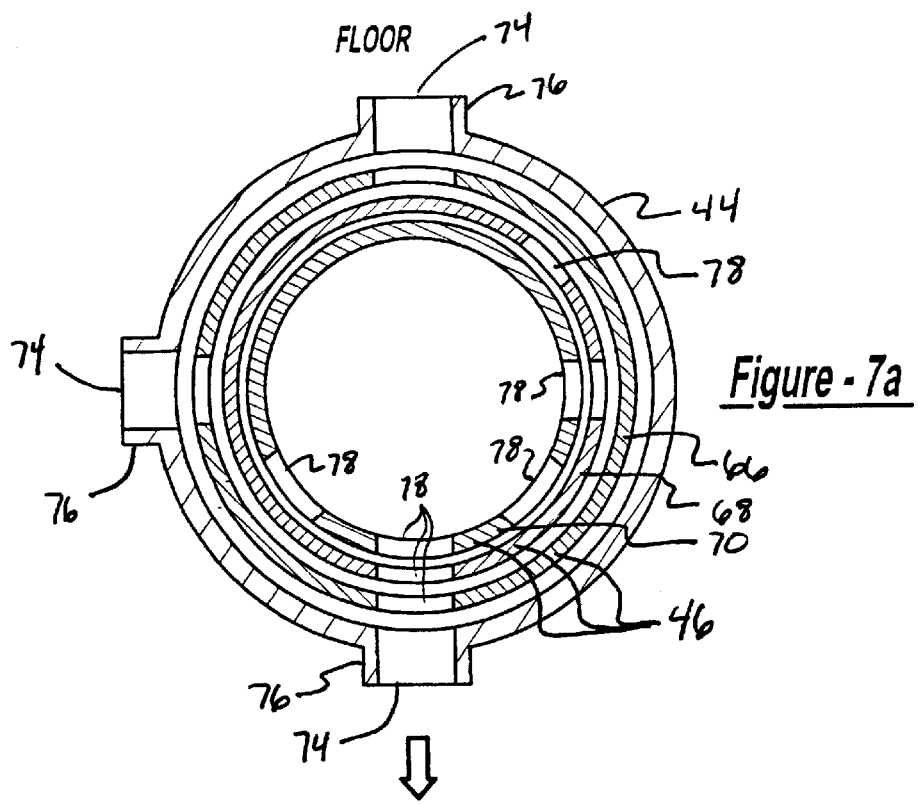
FIG. 7A is an example of a rotary distribution chamber aligned for distribution of air to a floor vent.

In FIG. 7A, the rotary distribution chamber 42 is positioned such that the floor mode is selected. Thus, the section in the second series of stepped diameters 64 that corresponds to the floor mode is positioned such that one of the apertures 78 on this section is aligned with the opening 76 on the outer chamber 44 that is pointed downward. It should be noted that the alignment of the three apertures 78 with the floor opening 74 is not necessary, and indeed does not contribute to air being directed to the floor because each of the three apertures 78 are on different axial sections within the second series of stepped diameter 64. Similarly, the alignment of the other aperture 78 on the section with the panel opening 74 on the outer chamber 44 is of no event because they too are on different sections. This is merely due to the use of stepped diameters, and reference back to the various views of the rotary distribution chamber 42 illustrates the lack of alignment.

Figure 7B:
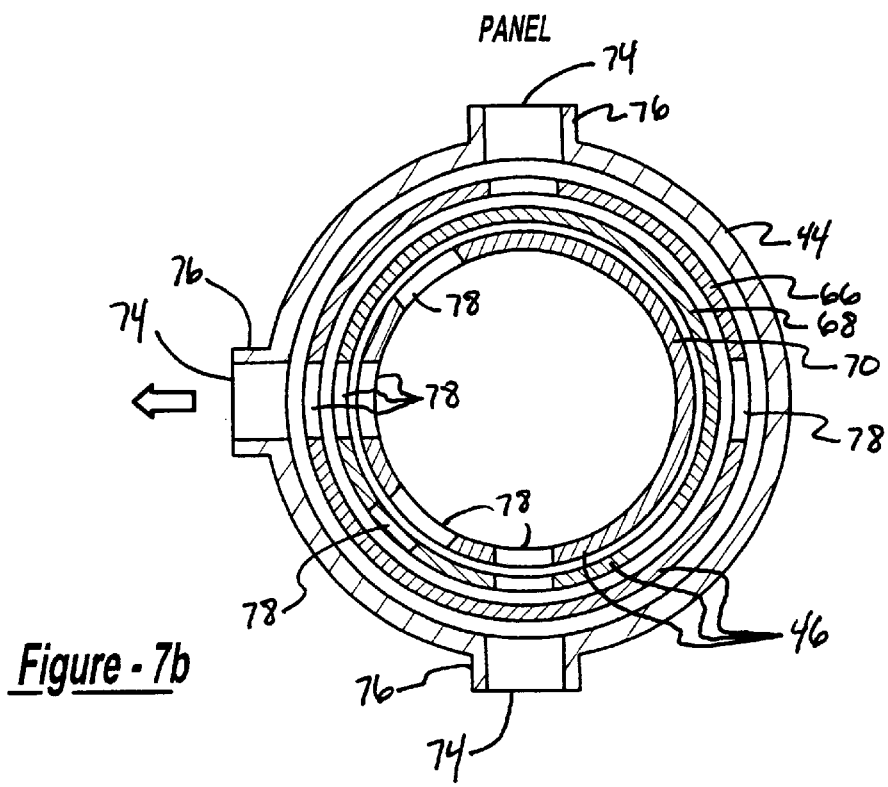
FIG. 7B is an example of a rotary distribution chamber aligned for distribution of air to a panel vent.
Figure 7C:
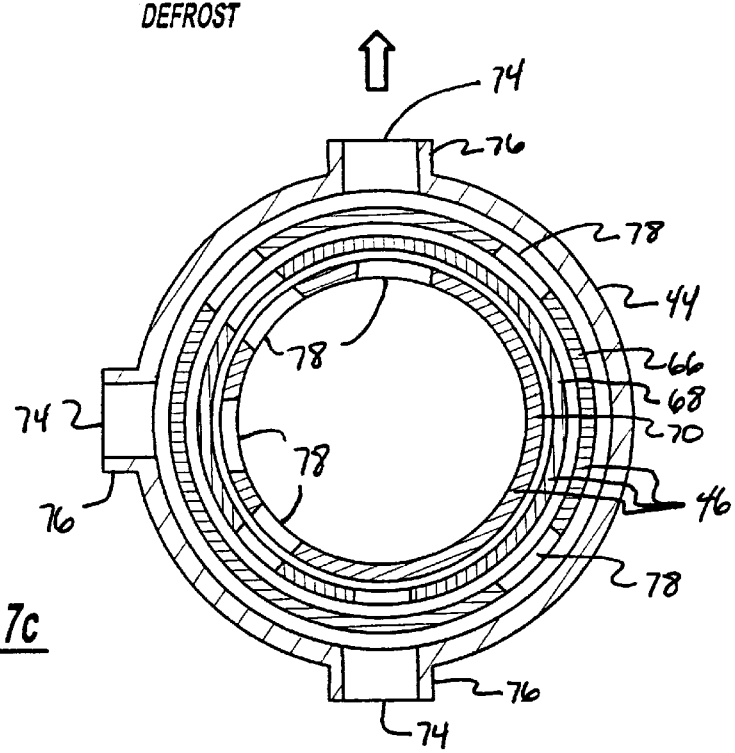
FIG. 7C is an example of a rotary distribution chamber aligned for distribution of air to a defrost vent.
Figure 7D:
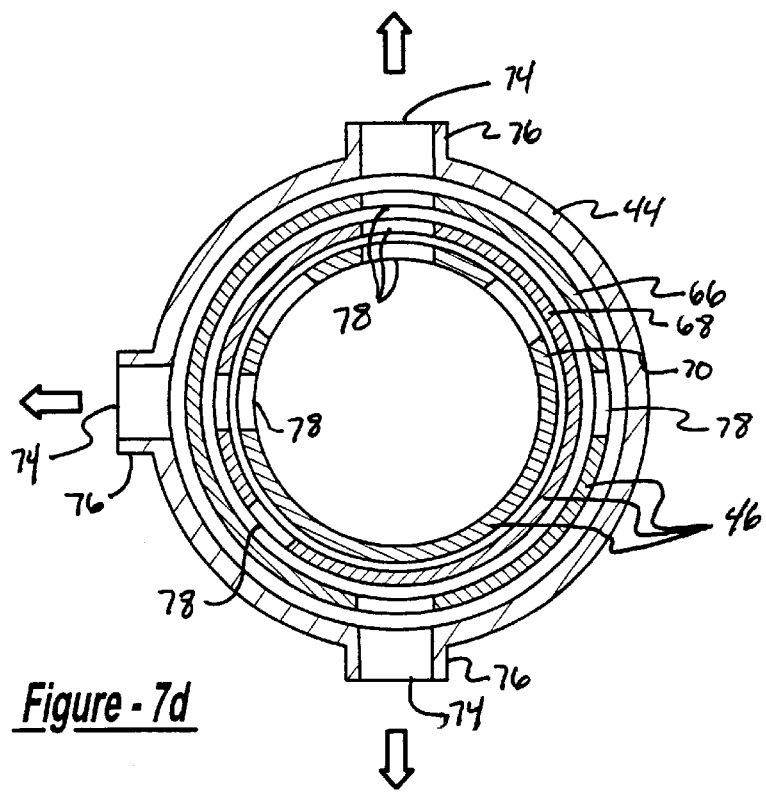
FIG. 7D is an example of a rotary distribution chamber aligned for distribution of air to a combination of floor, panel, and defrost vents.
Figure 7E:
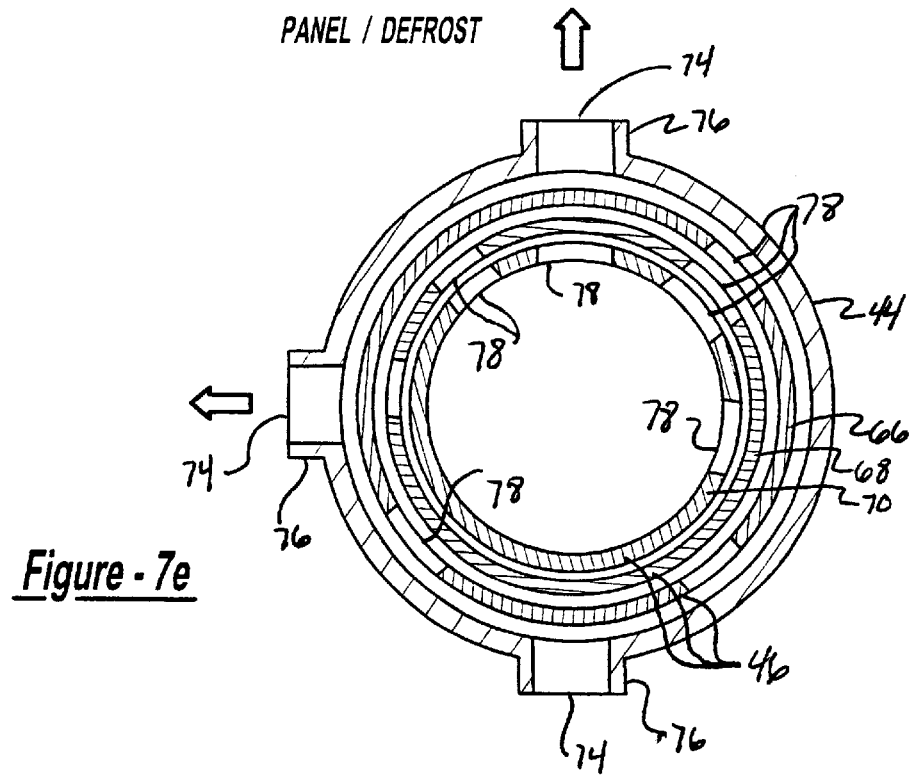
FIG. 7E is an example of a rotary distribution chamber aligned for distribution of air to a combination of panel and defrost vents.
Figure 7F:
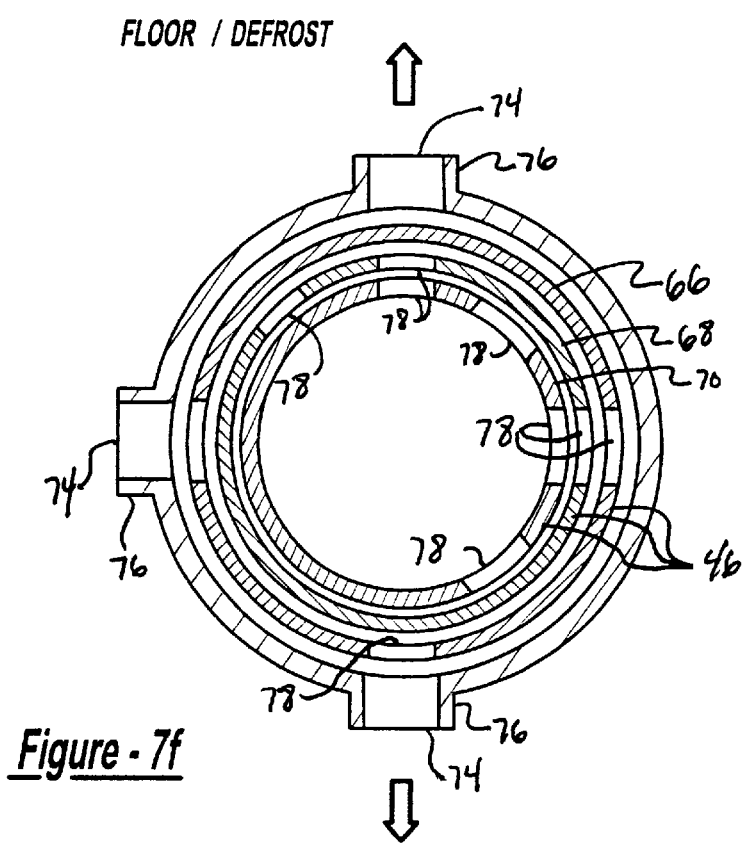
FIG. 7F is an example of a rotary distribution chamber aligned for distribution of air to a combination of floor and defrost vents.
Figure 7G:
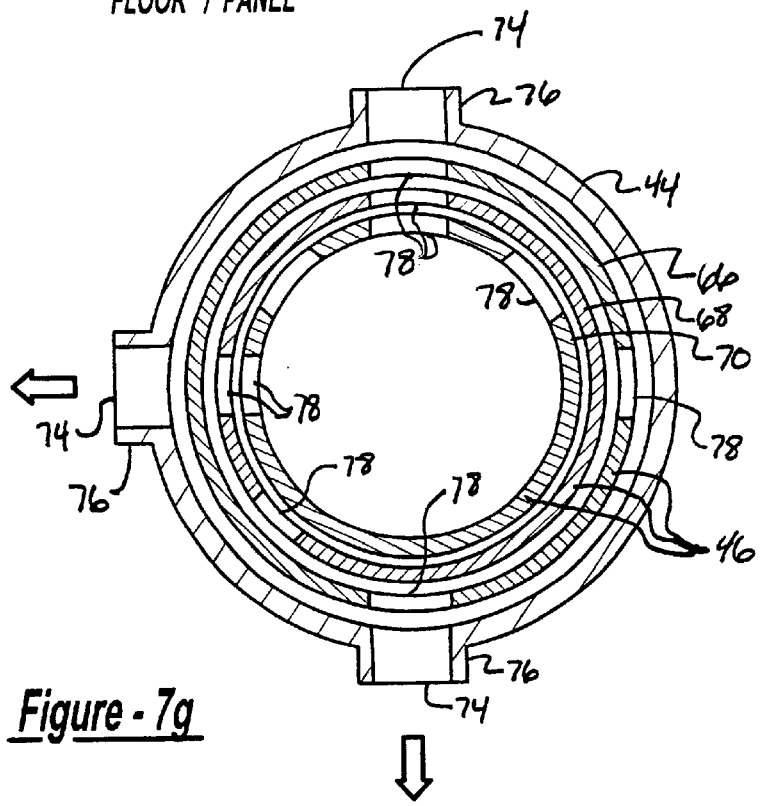
FIG. 7G is an example of a rotary distribution chamber aligned for distribution of air to a combination of floor and panel vents.
Figure 7H:
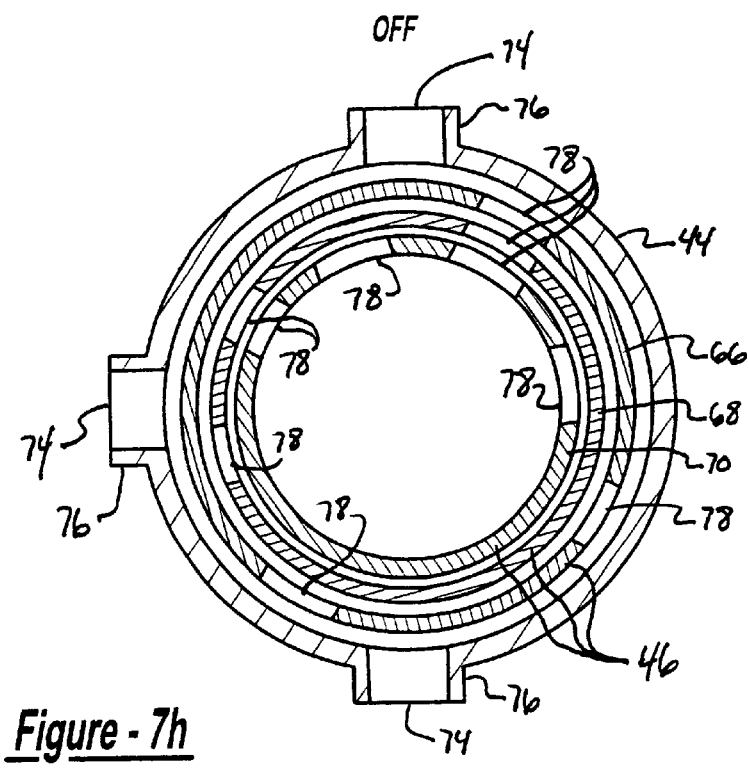
FIG. 7H is an example of a rotary distribution chamber aligned so that no air escapes the chamber.

In FIG. 7B, the rotary distribution chamber 42 is positioned such that the panel mode is selected. In FIG. 7C, the rotary distribution chamber is positioned such that the defrost zone is selected. In FIG. 7D, the rotary distribution chamber 42 is positioned such that a combination of a floor, panel, and defrost zones is selected. In FIG. 7E, the rotary distribution chamber 42 is positioned such that a combination of the panel and defrost zones is selected. In FIG. 7F, the rotary distribution chamber 42 is positioned such that a combination of the floor and defrost zones is selected. In FIG. 7G, the rotary distribution chamber 42 is positioned such that a combination of the floor and panel zones is selected. Lastly, in FIG. 7H, the rotary distribution chamber 42 is positioned such that no zone is selected, i.e., there no realignment between apertures 78 and openings 74 and, consequently, no air escapes the interior cavity 56 of the rotary distribution chamber 42.

FIG. 8 illustrates a second embodiment of the present invention. Except as detailed below, the second embodiment is similar to the first embodiment discussed above. As shown in the figure, the outer 44 and inner 46 chambers of this embodiment do not contain stepped diameters. Rather, each of the chambers 44,46 defines at least one recess 92 and flange 94. Preferably, each of the chambers 44, 46 defines a plurality of recesses 92 and flanges 94. The recesses 92 and flanges 94 interact with each other in a tab and slot manner. That is, the recess 92 is capable of receiving the flange 94. Preferably, the recess 92 is large enough to allow axial movement of one of the chambers 44, 46. This movement allows the desired decompression and recompression of the seal 54. The arrangement of recesses 92 and flanges 94 in this embodiment functions in a manner similar to that of the first 62 and second 64 series of stepped diameters in the first embodiment. Specifically, the recesses 92 and flanges 94 provide a series of complimentary surfaces capable of interacting with each other in a manner that allows the compression and decompression of a seal between them. Similar to the first embodiment, a seal may be created by a separate seal member 54 disposed between the chambers 44,46, or may be formed by contact by and between the chambers 44,46 themselves.

The foregoing disclosure is the best mode devised by the inventors for practicing the invention. It is apparent, however, that several variations in fluid distribution chambers in accordance with the present invention may be conceivable by one skilled in the art. Inasmuch as the foregoing disclosure is intended to enable one skilled in the pertinent art to practice the instant invention, it should not be construed to be limited thereby, but should be construed to include such aforementioned variations. As such, the present invention should be limited only by the spirit and scope of the following claims.

I claim:

1. A fluid distribution system for selectively distributing a fluid among various passageways, comprising:

a distribution chamber comprising an outer chamber having at least one opening having a flange and an inner chamber having at least one aperture selectively alignable with said flanged opening of said outer chamber, said inner chamber being disposed within said outer chamber creating a sealable relationship and being capable of axial and radial movement within said outer chamber, said distribution chamber having a closed end and an open end and defining a central cavity; and a plurality of passageways in communication with said at least one flanged opening of said outer chamber and extending away from said outer chamber, each of said passageways having an opening;

whereby axial movement of said inner chamber disengages said sealable relationship between said inner and outer chambers, and selective radial movement of said inner chamber relative to said outer chamber adjusts the alignment of said aperture with said flanged opening.

2. A fluid distribution system according to claim 1, wherein the sealable relationship between said inner and outer chamber is formed by multiple sections of said outer chamber defining a first series of stepped diameters and multiple sections of said inner chamber defining a second series of stepped diameters, said first and second series of stepped diameters permitting said inner chamber to be nestably disposed within said outer chamber.

3. A fluid distribution system according to claim 2, wherein said inner and outer chamber each include four sections.

4. A fluid distribution system according to claim 2, wherein each section of said outer chamber defines said opening having said flange.

5. A fluid distribution system according to claim 2, wherein each section of said inner chamber defines said aperture.

6. A fluid distribution system according to claim 1, wherein said distribution chamber further comprises at least one seal disposed between said inner and outer chambers.

7. A fluid distribution system according to claim 6, wherein said seal comprises a circumferential seal.

8. A fluid distribution system according to claim 1, further comprising a shaft disposed within said inner chamber and extending from said closed end to said open end of said distribution chamber, said shaft being capable of allowing said axial and radial movement of said inner chamber.

9. A fluid distribution system according to claim 8, further comprising an actuator connected to said shaft and capable of controlling said axial and radial movement of said inner chamber.

10. A fluid distribution system according to claim 1, wherein said distribution chamber further comprises a stabilizer disposed within said open end of said distribution chamber.

11. An air distribution system for distributing air to various vents in a motor vehicle, comprising:
- a distribution chamber comprising an outer chamber having multiple sections defining a first series of stepped diameters, each section having an opening with a flange, an inner chamber having multiple sections defining a second series of stepped diameters, each section having at least one aperture, said inner chamber being nestably disposed within said outer chamber and being capable of axial and radial movement within said outer chamber, means for controlling said axial and radial movement of said inner chamber, and means for releasably sealing said inner chamber to said outer chamber, said distribution chamber having a closed end and an open end and defining a central cavity; and
- a plurality of passageways in communication with said openings of said outer chamber and extending away from said outer chamber;
- whereby said axial and radial movement of said inner chamber relative to said outer chamber adjusts the alignment of said openings with said apertures.

12. An air distribution system according to claim 11, wherein said means for controlling said axial and radial movement of said inner chamber comprises an actuator.

13. An air distribution system according to claim 11, wherein said means for sealing comprise at least one seal.

14. An air distribution system according to claim 13, wherein said seal comprises a circumferential foam member.

15. An air distribution system according to claim 11, further comprising a shaft disposed within said outer chamber and extending from said closed end to said open end of said distribution chamber, whereby said shaft allows said axial and radial movement of said inner chamber.

16. An air distribution system according to claim 15, further comprising means for stabilizing said shaft within said open end of said distribution chamber.

17. A rotary distribution chamber for selectively distributing a fluid among various passageways in a fluid distribution system, said rotary distribution chamber comprising:
- an outer chamber having an exterior surface, a closed end and an open end, the outer chamber defining a cavity, a first series of stepped diameters, and a first main opening, and the exterior surface defining at least one opening having a flange;
- an inner chamber defining a second series of stepped diameters, a second main opening and at least one aperture, said inner chamber being nestably disposed within said outer chamber;
- a shaft disposed within said inner chamber and extending through said first and second main openings and being capable of axial and radial movement;
- whereby said axial and radial movement of said shaft results in axial and radial movement of said inner chamber relative to said outer chamber and adjusts the alignment of said opening with said aperture.

18. A rotary distribution chamber according to claim 17, further comprising a bushing disposed about said shaft and within said second main opening for translating said movement of said shaft to said inner chamber.

19. A rotary distribution chamber according to claim 17, further comprising an actuator for controlling said axial and radial movement of said shaft.

20. A rotary distribution chamber according to claim 17, further comprising a stabilizer disposed in said open end of said distribution chamber wherein said stabilizer is adapted to receive said shaft and allow said axial and radial movement of said shaft.

21. A rotary distribution chamber according to claim 17, further comprising a seal disposed between said inner and outer chambers.

22. A rotary distribution chamber according to claim 21, wherein said seal comprises a circumferential foam member.

* * * * *